April 19, 1960 W. R. ARSENAULT 2,933,718

MAGNETIC INFORMATION MEMBER

Filed March 29, 1956 2 Sheets-Sheet 1

WILLIAM R. ARSENAULT.
INVENTOR.

BY Smyth & Roston

ATTORNEY

WILLIAM R. ARSENAULT.
INVENTOR.
BY Smyth + Roston
ATTORNEY 2,933,718

MAGNETIC INFORMATION MEMBER

William R. Arsenault, Pacific Palisades, Calif., assignor to The Magnavox Company, Los Angeles, Calif., a corporation of Delaware Application March 29, 1956, Serial No. 574,874

21 Claims. (Cl. 340—174)

The present invention relates to record-read or record-reproducing apparatus in which information is magnetically recorded on a suitable medium for subsequent utilization. More particularly, the invention relates to an improved record-reproducing magnetic head for use in such apparatus and especially for such apparatus as is incorporated in electronic computer or data processing systems.

Significant advances have been made in the computer art, especially in computers which are predicated upon digital principles. In such computers, the binary number system is usually utilized to represent complex numbers, which can be represented by a series of ones or zeros. For example, a sequence of suitable signals representing 0110101 is, in turn, the binary representation of a decimal number of 53, where the least significant binary number is at the right. Therefore, any binary number can be stored on a magnetic memory by recording a series of magnetic bits where a first magnetic polarity represents the "ones" and the opposite magnetic polarity represents the "zeros."

Recording or storing of magnetic information representing binary numbers can conveniently be accomplished by the provision of a rotating drum with one or more read-record magnetic heads associated with a track on the drum. Each such track is a narrow band around the drum circumference, and each drum may have a number of such tracks spaced axially along its length. The storage drum is usually a cylinder made from a suitable material such as a metal or a plastic and having a magnetic substance such as iron oxide sprayed on its surface, this iron oxide having a high magnetic coercive force.

Record-read heads of the prior art usually took the form of a toroidal core composed, for example, of a suitable ferrite, with an air gap cut through the core to provide a fringing flux. At least one winding was wound around the core to establish a flux therein when a current was passed through the winding. An air gap was considered essential, since without it there would be no appreciable fringing flux to link with the storage drum because almost all the flux would travel through the relatively high permeability core.

It is evident that when a prior art head such as the one described above is used in conjunction with the magnetic storage or memory drum, the fringing flux magnetizes a portion of the surface of the storage drum to record on the drum information which is retained indefinitely due to the high coercive force of that surface. Conversely, when the head is passed over the magnetized surface of the drum, the flux from each bit of information links the head to induce a voltage in the winding so that the head may read the information stored on the drum.

Since a typical magnetic storage drum has a magnetic read-record head for each of its many tracks of information, a selection problem arises, particularly in the larger systems. That is, the system must be arranged so that any one of a large number of such heads may be selected at any particular time to record or read information on the storage drum by that particular head to the exclusion of all others. A recently proposed selection system uses a coincident current method which, in turn, depends upon cores having an essentially rectangular hysteresis loop. In such systems, all the heads are placed in a rectangular matrix such that a current $$\frac{I}{2}$$

may be impressed on all the heads on an ordinate axis and a current $$\frac{I}{2}$$

may be impressed on all the heads on a co-ordinate basis, so that only the head at the cross-over between the two axes will receive a current I. The heads are so constructed that only the latter head will respond. When the cores have an essentially rectangular hysteresis loop, they may conveniently be made to be unresponsive to the current $$\frac{I}{2}$$

that current being insufficient to remove the magnetic saturation of one polarity. However, the cores can be made responsive to the current I, the latter current being sufficient to remove the aforementioned saturation and to produce saturation of the opposite polarity. Such cores, therefore, are eminently suited for use in the selection system described above. However, the prior art heads having an air gap formed therein destroyed the rectangular hysteresis loop characteristic of the core, so that they were not suitable for use in such a selection system.

The need arose, therefore, to devise a head in which a fringing flux could be produced for linking with the magnetic surface of the storage drum without impairing the rectangular hysteresis loop characteristic of the core. This problem was largely solved in the system described and claimed in copending application Serial No. 488,073, which was filed February 14, 1955, in the names of the present inventor and of Ragnar Thorensen, and which is assigned to the assignee of the present application. The co-pending application describes a record-read magnetic head in which a fringing flux is produced by means of a short-circuited turn, rather than by an air gap, so that a continuous toroidal member can be used for the core with its essentially rectangular hysteresis loop characteristics preserved.

A problem has arisen, however, in the short-circuited turn type of head, in that the short-circuited turn responds only to a flux differential to produce the required fringing flux. When, for example, it is desired to record a series of ones and zeros in alternation, the flux in the head is reversed for each succeeding bit of information so that there is maximum flux differential, maximum current induced in the short-circuited turn, and maximum fringing and linking flux developed thereby. However, when it is desired to record successive "ones" or successive "zeros," the coercive force of the core material holds the core near magnetic saturation between successive bits, so that there is very little flux differential and, therefore, very little current induced in the short-circuited turn. This means that the short-circuited turn does not develop any appreciable amount of fringing and linking flux under this condition. This usually results in the linking magnetic flux having insufficient amplitude to erase previous information from the storage drum so as to produce a readable recording thereon.

This invention provides a magnetic record-reproducing head which can produce a considerable amount of flux for linkage with a drum regardless of the pattern of signals introduced to the head. For example, the head can produce a considerable amount of flux upon an alternate presentation of "1's" and "0's" or upon the sequential presentation of a considerable number of "1's" or the sequential presentation of a considerable number of "0's." The head produces this considerable amount of flux by automatically returning to a neutral state upon the presentation of each signal.

The head includes a saturable core of magnetic material and means such as first and second windings on the core for successively establishing a magnetic flux in the core representative of information to be retained by the memory member. The head also includes means such as a short circuited turn which is responsive to changes in the flux in the core for creating in the core a localized opposing flux which is also representative of the information to be retained by the memory member such as a magnetic drum. The localized opposing flux is adapted to link the memory member to produce magnetic information for retention by the memory member. The head further includes means such as a hole in the core and a winding threading the hole for biasing the core to reduce the residual flux therein essentially to zero between the successive establishments of the magnetic flux therein by the information means.

Figure 1:
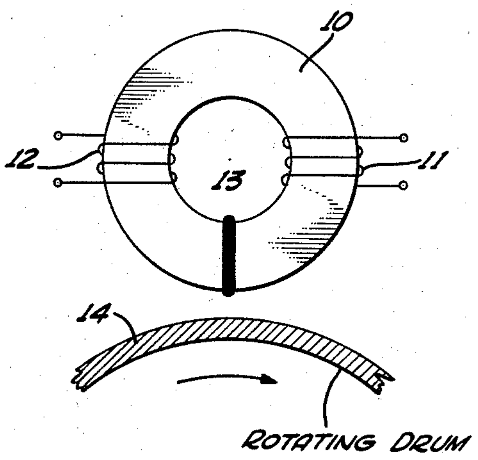
Figure 1 is a schematic representation of a magnetic record-head such as that described in the aforementioned copending application and also includes a fragmentary representation of a memory member associated with the head.

The record-read head described in the aforementioned copending application is shown schematically in Figure 1. The head comprises a toroidal core of ferrite or other magnetic material. The core has a first current conductor disposed in magnetic proximity to the core. The first current conductor may be a primary winding 11 wound around an annular section thereof. The core also has a second current conductor magnetically coupled to the core. The second conductor may be a primary winding 12 which is wound around an annular section of the core and which is angularly displaced from the first winding 11 and shown as being diametrically opposed thereto. The primary winding 12 is preferably provided with approximately the same number of turns as the primary winding 11. It should be appreciated that the windings 11 and 12 may be combined in a single winding which can perform the functions of both the windings 11 and 12 by passing current of opposite polarities through the single winding.

Figure 2:
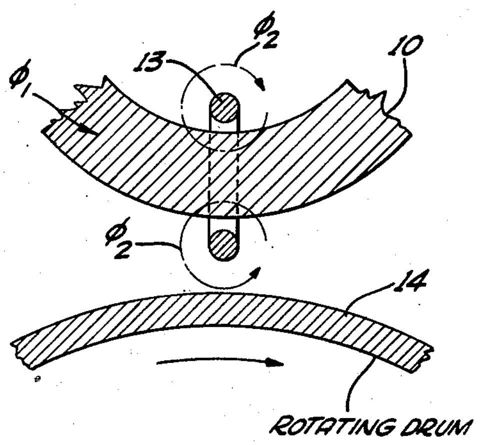
Figure 2 is an enlarged fragmentary view of the head and the memory member shown in Figure 1.
Figure 4:
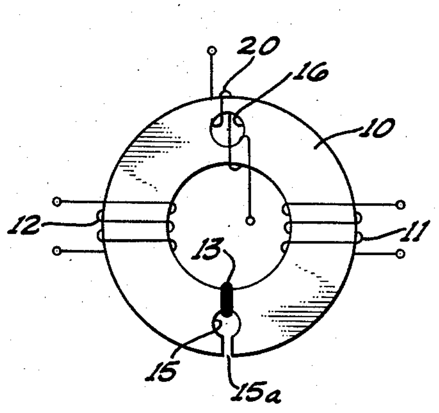
Figure 4 is a schematic representation of the improved magnetic record-read head of the present invention.

The core 10 also has a secondary winding 13 in the form of a single short-circuited turn wound around the core. The turn 13 may be wrapped around the core 10 at a position of full cross-sectional area of the core as shown in Figure 2, or it may be wound around the core at a position of reduced cross-sectional area as shown in Figure 4. By winding the turn 13 as shown in Figure 4, a magnetic member such as a magnetic drum generally indicated at 14 can be disposed in contiguous relationship to the core.

The magnetic drum 14 is disposed in contiguous relationship to the core 10 at a position adjacent the winding 13. For example, the periphery of the drum 14 may be separated from the periphery of the magnetic member 10 by a distance in the order of a few thousandths of an inch. The drum 14 may be formed from a non-magnetic cylinder which supports a peripheral layer of magnetic material having a thickness in the order of a few thousandths of an inch. The drum 14 is adapted to be rotated by a suitable motor (not shown) so that its periphery moves past the core 10.

When a current pulse is applied to one of the primary windings, it sets up a magnetomotive force in the core and causes a flux $\phi_1$ (Figure 2) to be produced in the core. The change in the flux or flux differential induces an electromotive force in the short-circuited turn 13 by usual transformer action. This electromotive force produces in turn 13 a current which generates a flux $\phi_2$. The flux $\phi_2$ encircles the turn, passes outside the confines of core 10 and links the surface of the memory drum 14 to produce a permanent magnetized area on the drum's surface. Since the winding 13 is short-circuited, the impedance of the turn is relatively low such that a relatively large current flows through the turn. Because of the considerable flow of current through the turn 13, a considerable amount of flux $\phi_2$ is generated for linkage with the periphery of the drum 14. The flux $\phi_2$ linking the drum 14 can be localized to a considerable extent on the drum by making the short-circuited turn 13 fairly thin. This is important in preventing the flux produced at one pulse position on the drum 14 from affecting the flux produced at adjacent positions on the drum 14. It is also important in insuring that a maximum number of pulse positions can be provided on the periphery of the drum.

Figure 3:
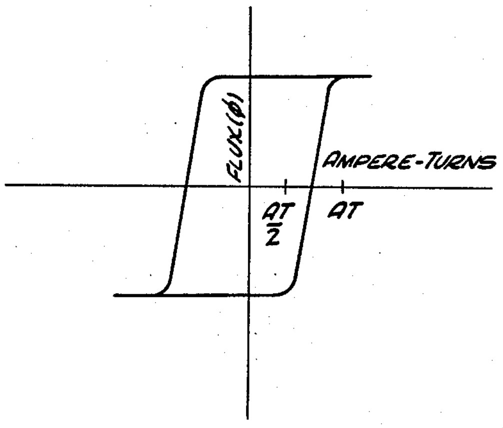
Figure 3 is a representation of the hysteresis loop of a core which is included in the head of Figures 1 and 2.

The head shown in Figures 1 and 2 is more fully described in the aforementioned co-pending application. As noted therein, the magnetic properties of the core material are preserved because of the fact that no air gap is cut fully through the core. This causes the core to have a substantially rectangular hysteresis loop. The substantially rectangular hysteresis loop is shown by way of example in Figure 3. Assuming that the core is magnetically saturated in a negative sense and that a current pulse corresponding to $$\frac{AT}{2}$$

is passed through the primary winding 11, the magnetization of the core is unchanged and the termination of the current pulse finds the core still saturated in the negative sense. When a current corresponding to AT is passed through this winding, the saturation of the core quickly reverses and the core becomes magnetically saturated in the positive sense. The opposite reaction occurs when a current pulse is impressed on winding 12. Therefore, the core can be used in a coincident current selecting system since it is unresponsive to current impulses corresponding to $$\frac{AT}{2}$$

but is responsive to current pulses corresponding to AT.

As previously noted, because the shorted turn 13 responds only to flux changes to produce the leakage flux $\phi_2$, the system is not susceptible to recording successive bits of information of like magnetic polarity. In order to overcome this situation, the present invention provides a means for returning the net flux in the core 10 essentially to zero, or at least to a neutral state, between successive current pulses in windings 11 or 12. Therefore, there will always be an appreciable and essentially the same flux differential linking winding 13, regardless of whether the successive pulses represent like or unlike magnetic polarities.

The net flux around the core is returned substantially to zero by incorporating a bias winding which is shown in the schematic representation of Figure 4. Apart from the bias winding, the magnet head in the latter figure is essentially similar to the head of Figure 1, except that the short-circuited turn 13 is wound in an opening 15 extending axially through the core and having a gap 15a extending to the annular surface of the core. This gap does not change the magnetic hysteresis loop properties of the core to any appreciable extent, but it does allow larger wire with greater current carrying capacity to be used for the short-circuited turn without impairing the resolution of the information to be recorded on the storage drum. This expedient is fully described in the aforementioned copending application.

Another aperture 16 is formed either radially or axially through the core to provide a pair of core legs on either side of the aperture. A third current conductor extends through the aperture 16 to provide a magnetic coupling with the core 10. The third conductor may be a bias winding 20 wound through the aperture 16 to encircle both legs of the core, the portion of the winding around one leg being wound in the opposite direction to the portion around the other leg. The sense of the windings 20 is such that when a direct current bias current $I_b$ (Figure 5) is passed through the winding, a static flux $\phi'_2$ will be induced in one leg and a static flux $\phi''_2$ will be induced in the other leg. The current $I_b$ is given sufficient value so that the first leg will be saturated in the direction of $\phi'_2$ and the second leg will be saturated in the opposite direction of $\phi''_2$. This means that one annular portion of the core is magnetically saturated in one direction and the adjacent annular portion of the core is magnetically saturated in the opposite direction. Under this condition, the net flux around the toroidal core 10 is zero or substantially zero.

Now, if a current pulse is passed through the primary winding 11, it will tend to produce a flux $\phi_1$ in the core 10. One annular portion of the core is already saturated by the static flux $\phi'_2$ in this direction and the induced magnetomotive force will have little effect on this portion. In the other annular portion, the magnetomotive force induced by the primary 11 must first overcome the static bias flux $\phi''_2$ and it may then reverse the flux in this portion to the oppositely saturated condition.

Figure 5:
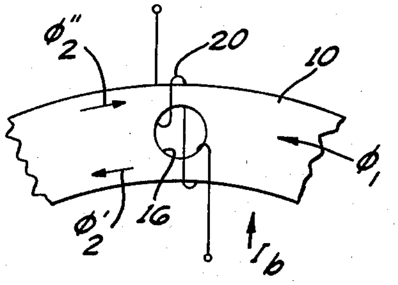
Figure 5 is an enlarged fragmentary view of a portion of the head shown in Figure 4.
Figures 6, 7:
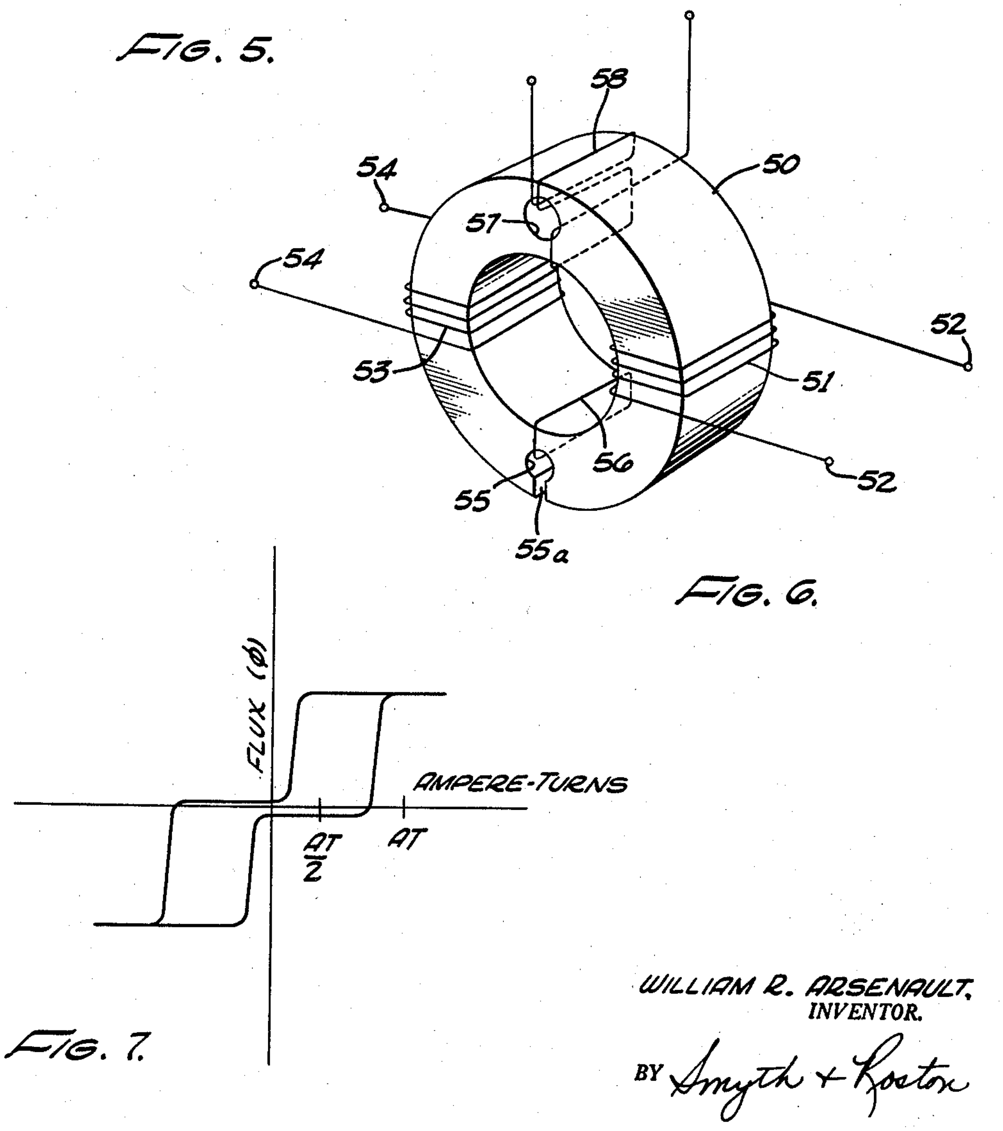
Figure 6 is a perspective view illustrating a commercial embodiment of the improved head of the invention.
Figure 7 illustrates the hysteresis loop of the core which is included in the head of Figures 4 and 5.

The effective hysteresis loop for the core of the magnetic head of Figures 4 and 5 is shown in Figure 7 when a direct current flows through the winding 20. When a current pulse corresponding to $$\frac{AT}{2}$$

is supplied to the primary winding 11, no flux change occurs since the resulting flux opposing $\phi''_2$ is insufficient to produce a magnetomotive force strong enough to overcome the flux $\phi''_2$. However, when a current pulse corresponding to AT is supplied to primary winding 11, the resulting flux is sufficient to overcome $\phi''_2$ and switch the net flux from zero to a positive saturated value. This change in flux induces a current in short-circuited turn 13 with a corresponding linkage flux for the storage member being developed. At the termination of the current pulse, the net flux around the core returns to zero. A current pulse through winding 12 produces the same effect in the opopsite sense.

On the basis of the above discussion, the core 10 can be used in a coincident current selection system since it can be constructed so that it does not respond to $$\frac{I}{2}$$

but will respond to I. Moreover, since the net flux in the core returns essentially to zero between successive current pulses, the net flux change is the same even when successive current pulses represent the same magnetic polarity or opposite polarities. By producing net flux changes of substantially constant amplitude in successive pulses regardless of the polarity of the successive pulses, signals of considerable amplitude can be induced in the drum 14, in every position in the drum. In this way, the output stages associated with the drum can be reduced in requirements because of the assurance that signals of large amplitude will always be presented.

It should be appreciated that the hole 16 in the core 10 can have a different configuration than that shown in Figure 4. For example, the hole 16 can have a radial configuration. In this configuration, the hole 16 would extend in a radial direction through the core toward the center of the core. The same magnetic results would be obtained for a radial configuration as for the axial configuration of the hole 16 in Figure 4.

It should also be appreciated that the member shown in Figure 4 can be used to read magnetic information previously recorded in the periphery of the drum 14. The reading of magnetic information is obtained by the induction of magnetic signals in the winding 13 as the successive positions on the drum 14 move past the short-circuited turn. The resultant flux produced by the turn 13 has a relatively large magnitude since the turn is short-circuited. This causes a considerable amount of flux to link the windings 11 and 12 for the induction of electrical signals in the windings. Signals of considerable amplitude are induced in the windings 11 and 12 since the flux level is returned to substantially zero after each position by the flow of a bias current through the winding 20.

A specific embodiment of the invention is shown in Figure 6, and this embodiment comprises a toroidal core 50 having an essentially rectangular cross section. A first primary winding 51 is wound around an annular section of the core and is connected to a pair of suitably mounted input terminals 52. A second primary winding 53 is wound around an annular section of the core diametrically opposite to winding 51 and in the opposite sense. The second primary winding is connected to a pair of suitably mounted input terminals 54. A first axial aperture 55 is formed through the core, and this aperture has a radial opening 55a extending to the outer periphery of the core to form a partial air gap, such as described previously herein. A short-circuited secondary turn 56 is wound around the core and through aperture 55. A second axial aperture 57 is formed through the core diametrically opposite the aperture 55. A bias winding 58 has a first portion wound around the outer leg of the core and through the aperture 57. The bias winding 58 also has a second portion in series with the first portion and wound around the inner leg of the core and through the aperture in the opposite sense to the first portion.

By way of example, core 50 may be formed of a ferrite such as designated $S_1$, $S_2$ or $S_3$ by the General Ceramic and Steatite Corporation of Keasbey, New Jersey. The core 50 may have an inside diameter of .18 inch, an outside diameter of .37 inch and a width of .12 inch. Windings 51 and 53 may each comprise approximately 200 turns of wire capable of carrying 100 milliamps so as to produce 20 amperes turns. The short-circuited turn may, for example, be number 30 wire for a sufficiently high current carrying capability, and the width of the gap 55a may be approximately .001–.002 inch to preserve resolution. The hole 57 has a diameter of .040 inch, and the bias winding has 5 turns around each leg of the core and is of number 40 wire. These dimensions, of course, merely represent a typical structure and are not to be construed as limiting the invention in any way.

The invention provides therefore an improved record-read magnetic head which is constructed to be suited for use in a simplified selection system of conputer or data processing equipment. The improved head is capable of recording magnetically represented information on a magnetic storage medium with equal facility when successive increments of such information have the same magnetic polarity or opposite magnetic polarity.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A magnetic record-read head for use with a memory member adapted to retain for subsequent use information represented by flux linking the member, including a saturable core of magnetic material, first means for successively establishing a magnetic flux in said core representative of information to be retained by the memory member, second means responsive to changes in the flux in said core for creating a localized opposing flux therein also representative of the information to be retained by the memory member and linking such member, and third means for biasing the core to reduce the residual flux therein to a substantially neutral state between the successive establishments of the magnetic flux therein by said first means.

2. A magnetic record-read head for use with a memory member adapted to retain for subsequent use information represented by flux linking the member, including a saturable core of magnetic material, first means for successively establishing a magnetic flux in said core representative of information to be retained by the memory member, second means responsive to changes in the flux in said core for creating a localized opposing flux therein also representative of the information to be retained by the memory member and linking the same, and third means for creating a static flux in said core having a first component in a first portion of said core tending to saturate said first portion and having a second component of opposite sense to said first component in a second portion of said core tending to saturate said second portion for the reduction of the residual flux in said core to a neutral state between the successive establishments of the magnetic flux therein by said first means.

3. A magnetic record-read head, including a saturable core of magnetic material, at least one primary winding on said core for producing a flux therein in response to a signal applied thereto, a short-circuited secondary winding encircling said core and responsive to a change in flux therein for producing a flux encircling said secondary winding and passing outside the confines of said core, and a biasing winding mounted on said core for producing a flux therein having one component tending to saturate a first portion of said core in one direction and further having a second component tending to saturate a second portion of said core in the opposite direction to obtain net residual flux approaching zero in said core in the absence of a signal in said primary winding.

4. A magnetic record-read head member including a saturable toroidal core of magnetic material, a first primary winding on said core for producing a saturating flux in said core in one direction in response to a signal applied thereto, a second primary winding on said core for producing a saturating flux in said core in the opposite direction in response to a signal applied thereto, a short-circuited secondary winding on said core responding to changes in flux therein for producing a flux encircling said secondary winding and passing outside the confines of said core, and a bias winding mounted on said core for producing a static flux therein having a first component saturating a first annular portion of said core in one direction and having a second component saturating a second annular portion of said core in the opposite direction so that the net residual flux around said core in the absence of a signal in said primary windings is essentially zero.

5. A magnetic record-head member including a saturable core of magnetic material, a first primary winding wound around a section of said core for producing a saturating flux in said core in one direction in response to a signal applied thereto, a second primary winding wound around a section of said core angularly displaced from said first primary winding for producing a saturating flux in said core in the opposite direction in response to a signal applied thereto, a short-circuited turn wound around said core and responsive to changes in flux therein for producing a flux encircling said turn and passing outside the confines of said core, bias winding means having a first portion surrounding a section of a first annular portion of said core for producing a first static flux therein for saturating said first portion in one direction, and said bias winding means having a second portion surrounding a section of a second annular portion of said core for producing a second flux in the opposite direction to said first flux and saturating said second annular portion to obtain a net residual flux of essentially zero intensity around said core in the absence of a signal in said primary windings.

6. The magnetic record-read head defined in claim 5 in which said first and second bias winding portions are formed by a continuous winding extending through an aperture in said core.

7. In combination with a memory member for retaining magnetic information represented by magnetic polarizations of the memory member, a magnetic core, at least a first conductor disposed in magnetic proximity to the core to produce a transducing action between electrical signals in the conductor and flux threading the core, a short-circuited conductor disposed in magnetic proximity to the core to provide for a linkage of leakage flux between the core and the memory member for the transfer of magnetic information between the magnetic member and the core as represented by the flux threading the core and the magnetic polarizations of the memory member, and a second current conductor disposed in magnetic proximity to the core for producing flux in the core upon the application of a biasing current to return the core to a neutral magnetic state upon each transfer of magnetic information between the magnetic member and the core.

8. Apparatus for use with a memory member adapted to retain for subsequent use magnetic information represented by flux linking the member, including a core shaped to provide a continuous path for the travel of magnetic flux through the core, a first current conductor looping the core and short circuited to produce magnetic flux flowing in a direction to oppose any transient flux in the core and in a path outside of the core and in linking relationship to the memory member, at least a second current conductor disposed in magnetic proximity to the core to produce transient magnetic flux in the core in accordance with the introduction of signal information to the conductor and regardless of the polarity of the signal information, and means including a third current conductor disposed in magnetic proximity to the core for receiving a bias current to return the flux level in the core to essentially a zero value upon each introduction of signal information to the second winding.

9. Apparatus as set forth in claim 8 in which the last mentioned means includes a hole in the core defining a pair of opposite legs in the core and in which the third current conductor threads the hole and has current of sufficient amplitude applied to its to produce saturating flux of one polarity in one leg and saturating flux of the opposite polarity in the other leg.

10. In combination with a memory member for retaining magnetic information represented by magnetic polarizations of the memory member, a magnetic core, means including a first winding for producing a magnetic flux extending through the core, means including a short-circuited turn disposed on the core in contiguous relationship to the memory member to enhance the magnetic coupling between the flux-producing means and the memory member, and means including a second winding extending through a hole in the core for receiving a bias to return the core to a state of magnetic neutralization after each production of magnetic flux in the core.

11. Apparatus for use with a memory member adapted to retain for subsequent use magnetic information represented by flux linking the member, including, a magnetic core, means for producing magnetic signals in the core, means for returning the flux in the core to a neutral level upon the production of the magnetic signals in the core, and means for producing an opposing force to the magnetic signals to obtain a localized flux linking the memory member and the core.

12. Apparatus as set forth in claim 7 in which a hole is provided in the core and the second current conductor extends through the hole to return the flux level in the core to a neutral state upon each transducing action between the core and the memory member.

13. Apparatus for use with a member constructed to retain magnetic information represented by flux linking the member, including, a saturable core of magnetic material positioned adjacent to the memory member and having first and second saturable flux states of opposite polarities and having a neutral flux state; first means magnetically coupled to the core and to the magnetic member for successively establishing in said core a magnetic flux representative of information to be transferred between the member and the core and for successively driving said core into said saturated flux states of first and second polarities in representation of such information, and second means magnetically coupled to the core for returning said core from either of said first and second saturable flux states to said neutral flux state upon each successive operation of said first means.

14. Apparatus in accordance with the claim 13 wherein said second means includes a bias winding disposed in magnetic proximity to said core and wound through a hole in the core.

15. Apparatus for use with a member constructed to retain magnetic information represented by flux linking the member, a core constructed of magnetic material and having properties to produce saturable fluxes and a neutral flux, a first winding coupled magnetically to the core and disposed in magnetically coupled relationship to the member to provide a transducing action between the production of flux in the member and the production of a corresponding flux of saturated intensity in the core, means including a second winding magnetically coupled to the core to return the fluxes in the core to a neutral state upon each production of fluxes of saturable intensity in the core, and means including a third winding magnetically coupled to the core to provide a transducing action between the production of saturable fluxes in the core and the production of an electrical signal having properties representative of such flux.

16. Apparatus as set forth in claim 15 in which the second winding extends through a hole in the core and a voltage source is connected to the winding to produce a flow of direct current through the winding.

17. Apparatus for use with a member constructed to retain magnetic information represented by flux linking the member, including, a saturable core of magnetic material, first means magnetically coupled to the core and disposed in magnetically coupled relationship to the member for successively producing saturating magnetic fluxes in the core in accordance with the magnetic fluxes in the member, second means magnetically coupled to the core for biasing the core to reduce the residual flux in the core to a substantially neutral state between the successive establishments of the magnetic flux in the core by the first means, and third means responsive to changes in the flux in the core for producing an output signal in accordance with the information represented by the saturated flux produced in the core by the first means.

18. Apparatus for use with a member constructed to retain magnetic information represented by flux linking the member, including, a core formed from magnetic material and having properties of producing saturated flux in the core, a short-circuited secondary winding encircling the core and magnetically coupled to the member for producing a saturated flux in the core in accordance with the magnetic information in the member, a biasing winding disposed on the core for producing in the core a flux having one component tending to saturate a first portion of the core with flux of one polarity and further having a second component tending to saturate a second portion of the core with flux of a second polarity to obtain a net residual flux of neutral intensity in the core in the absence of magnetic flux linking the short-circuited winding as a result of flux produced by the member, and a third winding disposed on the core for producing an output signal in accordance with the characteristics of the flux linking the short-circuited winding as a result of flux produced by the member.

19. Apparatus for use with a member constructed to retain magnetic information represented by flux linking the member, including, a core shaped to provide a continuous path for the travel of magnetic flux through the core and provided with properties for producing saturated flux in the core, a first current conductor looping the core and disposed in magnetically coupled relationship to the member to produce saturated magnetic flux in the core in accordance with the flux in the magnetic member, means including a second current conductor disposed in magnetic proximity to the core for receiving a bias current to return the flux level in the core to a neutral state upon each production of fluxes in the core by the first winding, and a third current conductor disposed in magnetic proximity to the core to produce an output signal having characteristics dependent upon the characteristics of the saturated flux produced in the core by the first winding.

20. Apparatus as set forth in claim 19 in which the last mentioned means includes a hole in the core defining a pair of opposite legs in the core and in which the third current conductor threads the hole and has current of sufficient amplitude applied to it to produce saturated flux of one polarity in one leg and saturated flux of the opposite polarity in the other leg.

21. Apparatus for use with a member constructed to retain magnetic information represented by flux linking the member, including, a magnetic core, means including a short-circuited turn disposed on the core in contiguous relationship to the member to obtain the production of saturated fluxes in the core in accordance with the flux linking the turn and produced by the member, there being a hole in the core, means including a second winding extending through the hole in the core for receiving a bias to return the core to a state of magnetic neutralization after each production of saturable magnetic flux in the core by the first winding, and means including a third winding disposed on the core for producing electrical signals having characteristics dependent upon the saturated flux produced in the core by the first winding.

References Cited in the file of this patent

UNITED STATES PATENTS

| | | |
|---|---|---|
| 2,519,426 | Grant | Aug. 22, 1950 |
| 2,677,019 | Buhrendorf | Apr. 27, 1954 |
| 2,700,703 | Nordyke | Jan. 25, 1955 |
| 2,722,569 | Loper | Nov. 1, 1955 |